(12) United States Patent
Zalkin et al.

(10) Patent No.: US 6,525,498 B2
(45) Date of Patent: Feb. 25, 2003

(54) ELECTRIC MOTOR CONTROL DEVICE, METHOD AND PROGRAM

(75) Inventors: Daniel Zalkin, Saint Laurent du Tencement (FR); Laurent Ostrowski, Bernay (FR); Philippe Matthys, Montreuil l'Argillé (FR)

(73) Assignee: Etablissements Andre Zalkin, Rueil Malmaison (FR)

( * ) Notice: Subject to any disclaimer, the term of this patent is extended or adjusted under 35 U.S.C. 154(b) by 0 days.

(21) Appl. No.: 09/819,685

(22) Filed: Mar. 29, 2001

(65) Prior Publication Data

US 2001/0026135 A1 Oct. 4, 2001

(30) Foreign Application Priority Data

Mar. 30, 2000 (FR) .............................. 0004011

(51) Int. Cl.$^7$ ................................. H02P 7/00
(52) U.S. Cl. ..................... 318/432; 318/434; 53/317; 53/331.5; 53/490
(58) Field of Search ................. 318/432, 434; 53/317, 331.5, 490

(56) References Cited

U.S. PATENT DOCUMENTS

| | | | |
|---|---|---|---|
| 4,803,640 A | 2/1989 | Mitomi et al. ............... | 364/513 |
| 4,934,844 A | 6/1990 | Orii ............................ | 388/840 |
| 5,075,870 A | 12/1991 | Kojyo et al. ................... | 395/89 |
| 5,321,935 A | 6/1994 | Spatz et al. .................... | 53/490 |
| 5,400,564 A | 3/1995 | Humphries et al. ............. | 53/75 |
| 5,419,094 A | * 5/1995 | Vander Bush, Jr. et al. ..... | 53/75 |
| 5,587,762 A | 12/1996 | Watanabe ..................... | 396/95 |
| 5,718,097 A | * 2/1998 | Kinoshita et al. .............. | 53/75 |
| 5,881,326 A | 3/1999 | Sakamoto .................... | 396/161 |
| 6,105,343 A | * 8/2000 | Grove et al. .................. | 53/490 |

FOREIGN PATENT DOCUMENTS

| | | |
|---|---|---|
| DE | 37 15935 | 11/1988 |
| EP | 0 524 196 | 1/1993 |
| EP | 0 618 168 | 10/1994 |

* cited by examiner

Primary Examiner—Robert E. Nappi
Assistant Examiner—Rina I. Duda
(74) Attorney, Agent, or Firm—Smith, Gambrell & Russell, LLP

(57) ABSTRACT

A device for controlling an electric motor measures the current $I_m$ drawn by the motor and the torque $C_m$ supplied by the motor. It includes a power supply 4 for the motor and an initialization unit 16 capable of generating a torque set point $C_c$ and of receiving and processing information relating to the current $I_m$ and the torque $C_m$ to deduce therefrom a relationship between the set point $C_c$, the torque $C_m$ and the current $I_m$ in order to be able to determine the torque $C_m$ from the set point $C_c$ and the current $I_m$.

24 Claims, 5 Drawing Sheets

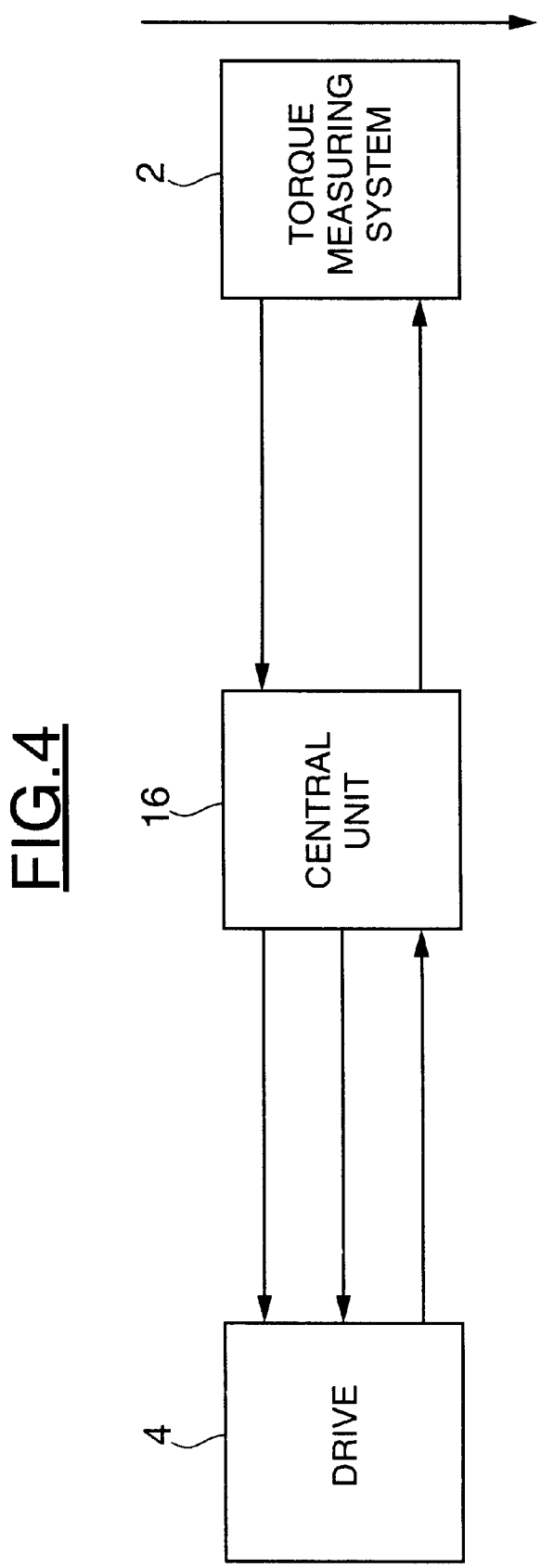

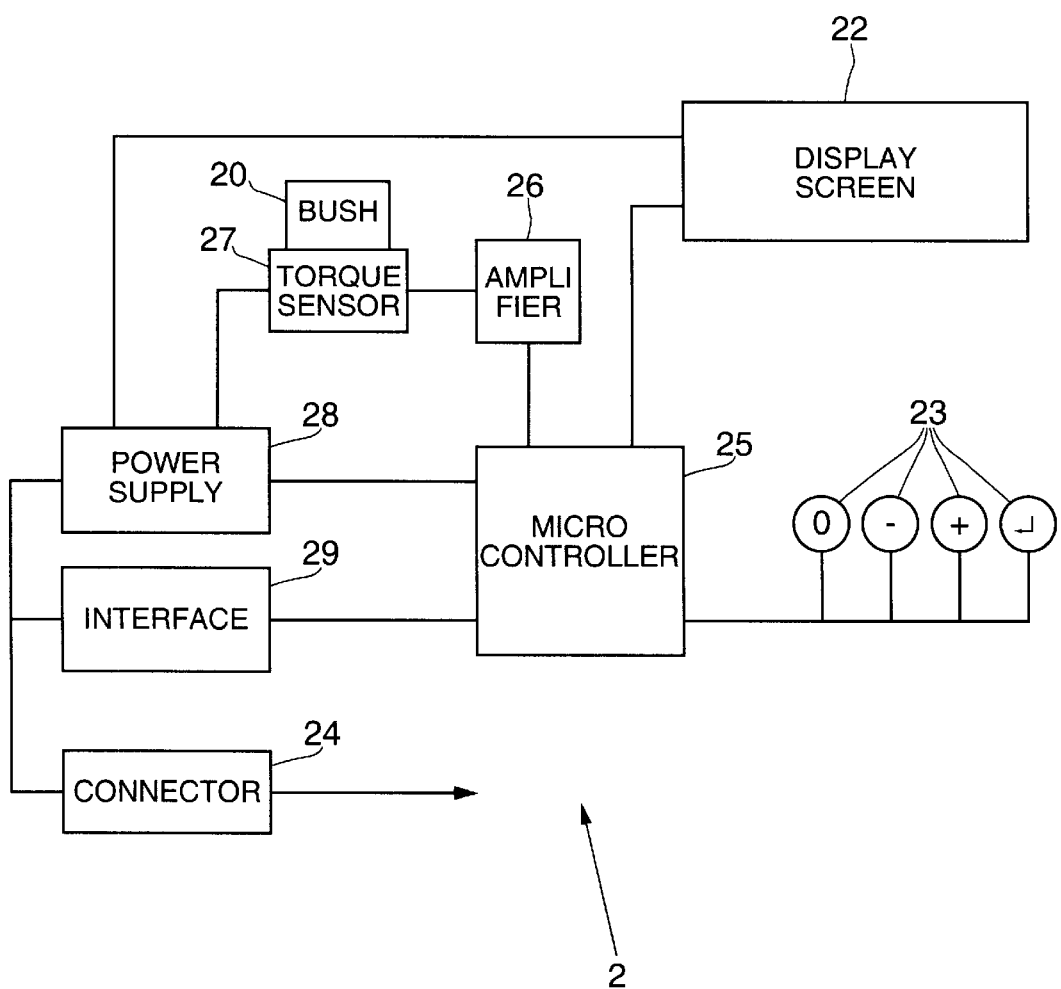

ELECTRIC MOTOR CONTROL DEVICE, METHOD AND PROGRAM

BACKGROUND OF THE INVENTION

1. Field of the Invention

The present invention relates to the field of electric motor control, in particular the field of calibrating an energy conversion device.

The present invention can be applied in fields where an electric motor must apply a precise torque to an object, for example in the field of screwing, in particular of screwcaps.

2. Description of the Prior Art

The document EP 0 524 196 discloses a screwing device including a stopper cone, a motor for driving rotation of the stopper cone, a switching device and a power supply. A control device includes a torque sensor adapted to measure an instantaneous drive torque, a comparator for comparing the instantaneous torque with a predetermined closure torque, and a sensor responsive to the angle of rotation of the cap receiving member adapted to be activated only if the instantaneous torque reaches the predetermined value. Thus a drive torque is applied to a cap to screw it onto a container, the instantaneous torque applied to the cap is measured and compared with a closure torque of predetermined value, and the rotation angle of the cap is measured only if the instantaneous torque reaches the predetermined value.

However, the presence of a torque sensor and an angle sensor makes the device somewhat complicated without guaranteeing very reliable and convenient closure of the containers by the caps.

The present invention proposes, in particular, an improved control device and method enabling a very precise torque to be applied.

The present invention proposes, in particular, an economical calibration method reducing the duration of the maintenance calibration operations carried out at regular intervals during the life of an electric motor.

SUMMARY OF THE INVENTION

The device in accordance with one aspect of the invention is for controlling an electric motor and includes means for measuring the current $I_m$ drawn by the motor, means for measuring the torque $C_m$ supplied by the motor, power supply means for the motor, and an initialization unit capable of generating a torque set point $C_c$ and of receiving and processing information relating to the current $I_m$ and the torque $C_m$ to deduce therefrom a relationship between the set point $C_c$, the torque $C_m$ and the current $I_m$ in order to be able to determine the torque $C_m$ from the set point $C_c$ and the current $I_m$.

The means for measuring the torque $C_m$ supplied by the motor are advantageously removable. They can be removed after calibration, the torque $C_m$ being controlled in accordance with the set point $C_c$ and verified by means of the current $I_m$.

In one embodiment of the invention the device includes a calculation unit associated with memory means and a user interface, a first data bus between the initialization unit and the power supply means of the motor, and a second data bus between the initialization unit and the calculation unit.

In one embodiment of the invention the means for measuring the torque $C_m$ are provided with a removable calibrator for calibrating the torque measuring means.

The device can be used to control a plurality of motors and can include a corresponding number of current measuring means and motor power supply means.

The invention also relates to an electromechanical system including a device as defined hereinabove. The system can be a machine for applying a particular torque to an object, for example a screwing, drilling, tapping, capping, etc. machine.

The method according to one aspect of the invention is for controlling an electric motor. An initialization unit generates a torque set point $C_c$ addressed to power supply means of the motor. Current measuring means measure the current $I_m$ drawn by the motor. Torque measuring means measure the torque $C_m$ supplied by the motor. The initialization unit receives and processes information relating to the current $I_m$ and the torque $C_m$ to deduce therefrom a relationship between the set point $C_c$, the torque $C_m$ and the current $I_m$ in order to be able to determine the torque $C_m$ from the set point $C_c$ and the current $I_m$.

The torque measuring means are preferably installed beforehand and then removed after measuring at least one value of the torque $C_m$. The same torque measuring means can be used for several electric motors.

In one embodiment of the invention the initialization unit generates three torque set point values $C_c$, the current measuring means measure n values of the current $I_m$ drawn by the motor, where n is greater than 2, the torque measuring means measure n values of the torque $C_m$ supplied by the motor, and the initialization unit receives and processes n values relating to the current $I_m$ and the torque $C_m$ to deduce therefrom a relationship between the set point $C_c$, the torque $C_m$ and the current $I_m$ in order to be able to determine the torque $C_m$ from only the set point $C_c$ and the current $I_m$.

In one embodiment of the invention the initialization unit calculates three coefficients a, b, c of a second order equation relating to the set point $C_c$ and the torque $C_m$ and three coefficients a', b', c' of a second order equation relating the current $I_m$ and the torque $C_m$. Using a second order equation is very suitable when using electric motors operating over a particular range outside their area of linear operation. A higher order equation or any other type of mathematical equation can be used for operation over a very wide range.

The computer program in accordance with one aspect of the invention includes program code means for implementing the steps of the method defined hereinabove.

The medium in accordance with one aspect of the invention can be read by a device for reading program code means stored therein and which are adapted to implement the steps of the method defined hereinabove.

One particular embodiment of the invention is shown in the accompanying drawings.

BRIEF DESCRIPTION OF THE DRAWINGS

FIG. 4 is a process step flowchart.

FIG. 5 is a block diagram of a torque measuring system.

DETAILED DESCRIPTION OF THE PREFERRED EMBODIMENTS

It is appropriate to remind the reader here that combining small brushless DC electric motors with a suitable electronic control circuit closes the loop of a control process traditionally implemented with no feedback of information. Brushless electric motors have the particular feature of applying a constant torque that is directly proportional to the supply current and of rotating at a speed related to the frequency of switching the current in their winding, independently of the value of the current.

For correct screwing, the aim is therefore to control the maximum current that the motor can draw during screwing and to provide a frequency of switching the current in the windings proportional to the speed of the machine. By measuring the current that the motor actually draws, the value of the torque applied by a screwing head associated with the motor can be determined and, in the case of an application to bottling, that information can be used to eject automatically a package or a bottle whose capping is outside specified tolerances.

However, the question arises as to the validity of the estimated torque actually applied on the basis of the current delivered by the variable speed drive controlling the motor and the validity of measuring the torque on the basis of the current drawn.

Figure 1:
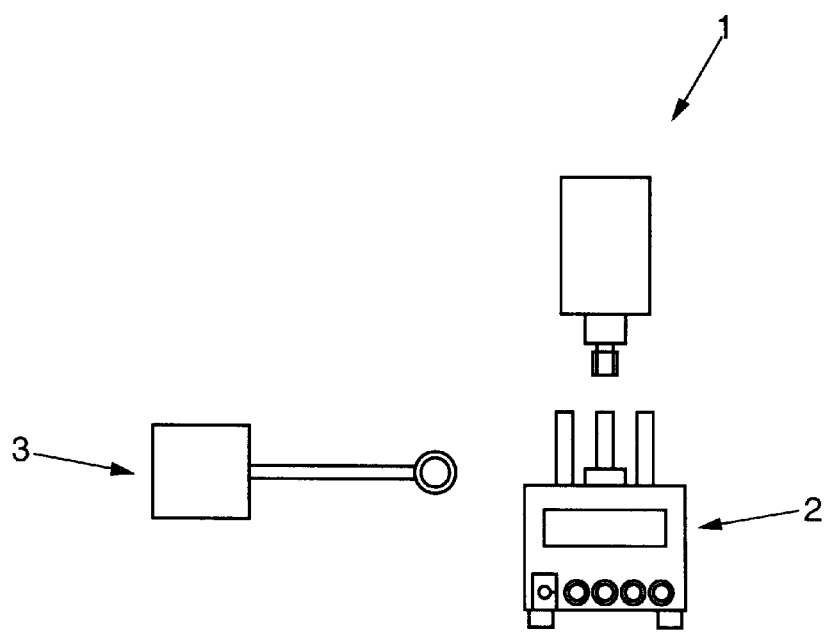
FIG. 1 is a diagrammatic view of a motor, a torque measuring system and a calibrator.

As can be seen in FIG. 1, the invention proposes to associate with an electric motor 1 a torque measuring system 2 and a torque calibrator 3. It is therefore possible, by calibration, to establish a reliable correspondence between a motor power supply set point, a measured drawn current and a torque actually applied. The torque measuring system 2 can itself be calibrated by means of the torque calibrator 3, which consists of a mass fixed to the end of a lever arm. The torque measuring system 2 includes a torque sensor and an electronic control unit for carrying out a measurement sequence and calculating control parameters for each motor.

Figure 2:
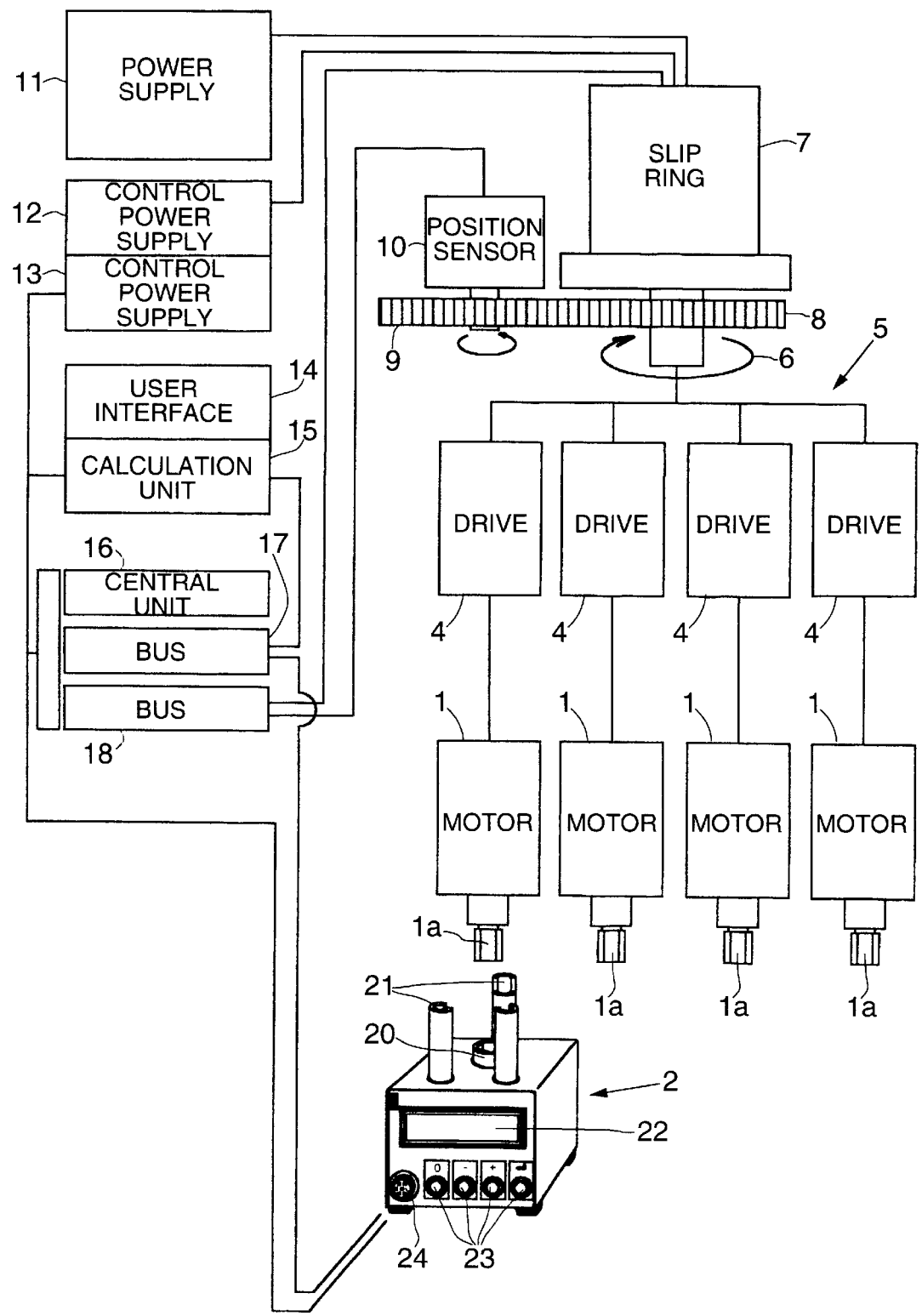
FIG. 2 is a diagrammatic view of a motor control device and its environment.

FIG. 2 refers more particularly to an application to the field of bottling. A machine for screwing caps onto bottles is generally installed in a bottle processing system. While the bottles are travelling through the machine along a circular arc path a cap is screwed onto each bottle. The bottles then leave the machine. The caps are taken up one by one by handling members which move toward the neck of a bottle, for example with a vertically downward movement, and each is then driven in rotation by a motor as the bottles move along their circular arc in the machine.

Broadly speaking, it can therefore be seen that the cap screwing machine includes a plurality of motors 1 each associated with a variable speed drive 4 adapted to provide an appropriate electrical power supply. The handling members that are normally mounted on the output shafts of the motors are not shown. The motors 1 and the variable speed drives 4 are part of a rotary assembly 5 which is generally referred to as turret and is adapted to turn in the direction of the arrow 6, for example. The turret 5 is equipped with a rotary slip-ring 7 for passing signals between the variable speed drives 4 and non-rotating parts of the machine. A toothed wheel 8 attached to the turret 5 meshes with another toothed wheel 9 carried by a shaft provided with an angular position sensor 10 which outputs an electrical signal representative of the angular position of the toothed wheel 9 and consequently of the toothed wheel 8 and the turret 5. The sensor 10 is mounted on a non-rotating part of the machine.

The machine further includes a power supply 11 connected to the rotary slip-ring 7 and adapted to supply the variable speed drives 4 with the electrical power needed to drive the motors 1, a control power supply 12 also connected to the rotary slip-ring 7 and adapted to supply the variable speed drives 4 with a low-power 12 V DC or 24 V DC supply for the electronic circuit cards of the variable speed drives 4, and a control power supply 13 for non-rotating parts of the machine.

The machine further includes a user interface 14 including screen or indicator lamp type information display means and command input means such as control buttons or a touch-sensitive screen, an automaton 15, a central processor unit 16, a communication bus 17, for example an RS232 bus, and a high bit rate communication bus 18, for example a CAN bus.

The control power supply 13 is connected to the user interface 14, the automaton 15 and the central processor unit 16 and can be connected permanently to the torque measuring system 2. The automaton 15 can communicate with the other parts of the machine via the bus 17. The position sensor 10 is connected to the high bit rate bus 18. Likewise the rotary slip-ring 7, so that information can be sent quickly from or to the variable speed drives 4. The central processor unit 16 is connected to the bus 17 and to the bus 18. The automaton 15 controls the functions and controls of the machine and supplies the central processor unit 16 with capping set points chosen by means of the user interface 14.

The variable speed drives 4 take the form of control and power modules complying with set points received from the central processor unit 16 via the high bit rate bus 18 to start and stop the motors, adjust their speed, limit their torque, monitor the rotation of the motors, for example in increments of 10°, measure the current drawn, store current samples and take account of the action effected and its status.

The motors 1 can include a stator with three windings divided between a large number of notches, for example. Each motor 1 can be provided with three Hall-effect sensors and a rotor incorporating 12 permanent magnets, the whole being encapsulated in a sealed housing. The rotor is mounted on a shaft supported by a two-row ball bearing and terminating in a hexagonal drive tip 1a for fast coupling to cap handling systems or cooperation with the torque measuring system 2.

The torque measuring system 2 has a housing 19 one face of which carries a bush 20 adapted to be rotationally coupled to the end 1a of the shaft of a motor 1 to transmit the torque applied by the motor 1 to the torque measuring system 2. The same face of the housing 19 carries a plurality of fingers 21, three fingers in this example, whose shape and dimensions match the outside shape of the motors 1 so that the torque measuring system 2 can be immobilized against rotation on the motor 1 to enable fast temporary rotational coupling of the torque measuring system 2 to the motor 1 and the transmission of torque from the end 1a of the shaft of the motor 1 to the bush 20.

Another face of the housing 19 of the torque measuring system 2 carries a display screen 22, a plurality of control buttons 23 and a connector 24 for the connection via the bus 17.

In use, choosing a type of cap via the user interface 14 causes the following parameters to be sent from the automaton 15 to the central processor unit 16 over the bus 17: start and stop angular position, torque and speed set point, motor movement type, request for results such as applied torque and variable speed drive status. Angular values are stored in the central unit 16 which on reading the position signal sent by the position sensor 10 triggers the necessary instructions to the variable speed drives 4 in real time. The information fed back by the variable speed drives 4 of the central processor unit 16 can be either returned to the automaton 15 for processing, in particular in order to eject defective packages or bottles, or processed locally by the central processor unit 16. In this latter case, a logic output of the central processor unit 16 can activate ejection.

To be more precise, when the system is switched on, the automaton 15 initializes all the control functions of the machine, entailing rotation of the turret 5 at low speed to find a zero point of the position sensor 10, and waits until the central processor unit 16 is ready to communicate. The central processor unit 16 performs global torque measuring sampling for all the variable speed drives 4 in order to determine an acquisition frequency proportional to the actual speed of the machine, calculates current/motor torque and applied torque/current tables which are recalculated each time the system is switched on from respective coefficients a, b, c and a', b', c' which relate the motor torque $C_m$ and the torque set point $C_c$ and the measured current $I_m$ and the motor torque $C_m$. The central processor unit 16 waits for the position sensor 10 to be reset to zero and signals the acquisition of the zero to the automaton 15, which sends the packaging format, speed, torque, etc. parameters. The central processor unit 16 sends the variable speed drive 4 the screwing, speed, torque and torque application time parameters. The variable speed drives 4 wait for parameters and execution instructions. The motor torque $C_m$ is the actual applied torque.

In continuous operation the central processor unit 16 is informed of an angle of the turret 5 corresponding to the start of screwing to be executed by a given motor 1 and calculates the angle of the next motor. The central processor unit 16 associates the angle with the function to be executed, verifies authorization from the automaton 15 in the event of a missing bottle, prepares the message to be sent to the corresponding variable speed drive 4, and sends the message.

The variable speed drive 4 receives the start instruction and its parameters, starts the associated motor 1, acquires the drawn current $I_m$ and compares it to the torque set point $C_c$. When the set point $C_c$ is reached, the torque is maintained for a predetermined time, after which the motor 1 and acquisition of the current value are stopped, the most recent measurements being retained in memory. The average value of the maximum torque over a plurality of values is calculated and stored. The central processor unit 16 is informed of the end of screwing angle and calculates the angular position of the next motor 1. The central processor unit 16 associates the angle with the function to be executed, prepares the message to be sent to the corresponding variable speed drive 4, and sends the message. The variable speed drive 4 receives the stop instruction, confirms the stopping of the motor 1 and sends the central processor unit 16 information relating to the measured current $I_m$ and the stop angular position. The central processor unit 16 calculates the applied torque $C_m$, compares it with the set point $C_c$, and makes the result available to the automaton 15. The cycles of each screwing head continue up to the last head, the zero-crossing of the position sensor 10 reinitializing calculation of the angular positions.

In calibration mode, processing of the angular positions by the central processor unit 16 is deactivated and the torque measuring system 2 is energized by the control power supply 13 and connected to the central processor unit 16 via a bus 17. The central processor unit 16 sends the torque measuring system 2 the parameters of the bottling machine, for example number of heads, torque application time, and maximum motor torque.

For a given screwing head, the torque measuring system 2 sends the central processor unit 16 the current date and the central processor unit 16 returns the date the head was last calibrated. That date can be displayed on the screen 22 before the user enters the calibration torque. The value of the calibration torque determined by the user is sent to the central processor unit 16 which starts a measurement sequence or reports any errors detected.

A calibration sequence includes four measurements, respectively a high torque, a moderate torque, a low torque and the calibration torque entered by the user. Each measurement is effected as follows (see FIG. 4):

the motor 1 is started by the associated variable speed drive 4 on receiving the instruction from the central processor unit 16, the torque measuring system 2 detects the torque value on stopping the motor 1 and sends the torque value to the central processor unit 16, the central processor unit 16 requests the current value from the variable speed drive 4, the variable speed drive 4 sends the measured current value to the central processor unit 16, and the central processor unit 16 sends the torque measuring system 2 information relating to the status of the calibration.

After measuring the high, moderate and low torques, the central processor unit 16 calculates the new calibration coefficients using quadratic equations. In other words, the central processor unit 16 calculates three coefficients a, b and c of a second order equation relating the torque set point and the torque and three coefficients a', b' and c' of a second order equation relating the measured current $I_m$ and the torque $C_m$.

The fourth measurement (the calibration torque entered by the user) is effected as previously except that the central processor unit 16, on completing the measurement, sends the torque measuring system 2 the torque calculated with the new calibration parameters for display on the screen 22 and/or the measured torque and/or an error message if the discrepancy between the torque calculated and the torque measured exceeds a predetermined ceiling.

At the end of calibration, the torque measuring system 2 is removed and is therefore separated from the motor 1 and the end 1a of the shaft. A capsule-holding member can then be fitted to the end 1a to return the bottling machine to service.

Knowing the six coefficients a, b, c, a', b' and c', the actual torque as a function of the set point $C_c$ and the measured current $I_m$ is known precisely. The central processor unit 16 can calculate correspondence tables from the six coefficients. In normal operation the central processor unit converts the measured current value $I_m$ into a torque value using the aforementioned coefficients. All the coefficients automatically recalculated at the end of the calibration procedure are stored in the central processor unit 16 for each head of the machine. In particular, the head calibration procedure can be executed only in a "calibration" mode of the machine enabling stepwise rotation of the turret 5.

Connecting the torque measuring system 2 via the bus 17 automatically starts the central processor unit 16 and initializes the calibration program. The user is then prompted to enter and confirm the number of the head to be calibrated. The user then informs the torque measuring system 2 of the working torque or, failing this, the average value for the range used on the machine. This input is required only on changing a set point. Of course, the torque measuring system 2 is regularly calibrated using the calibrator 3 so that the measurements remain accurate.

Figure 3:
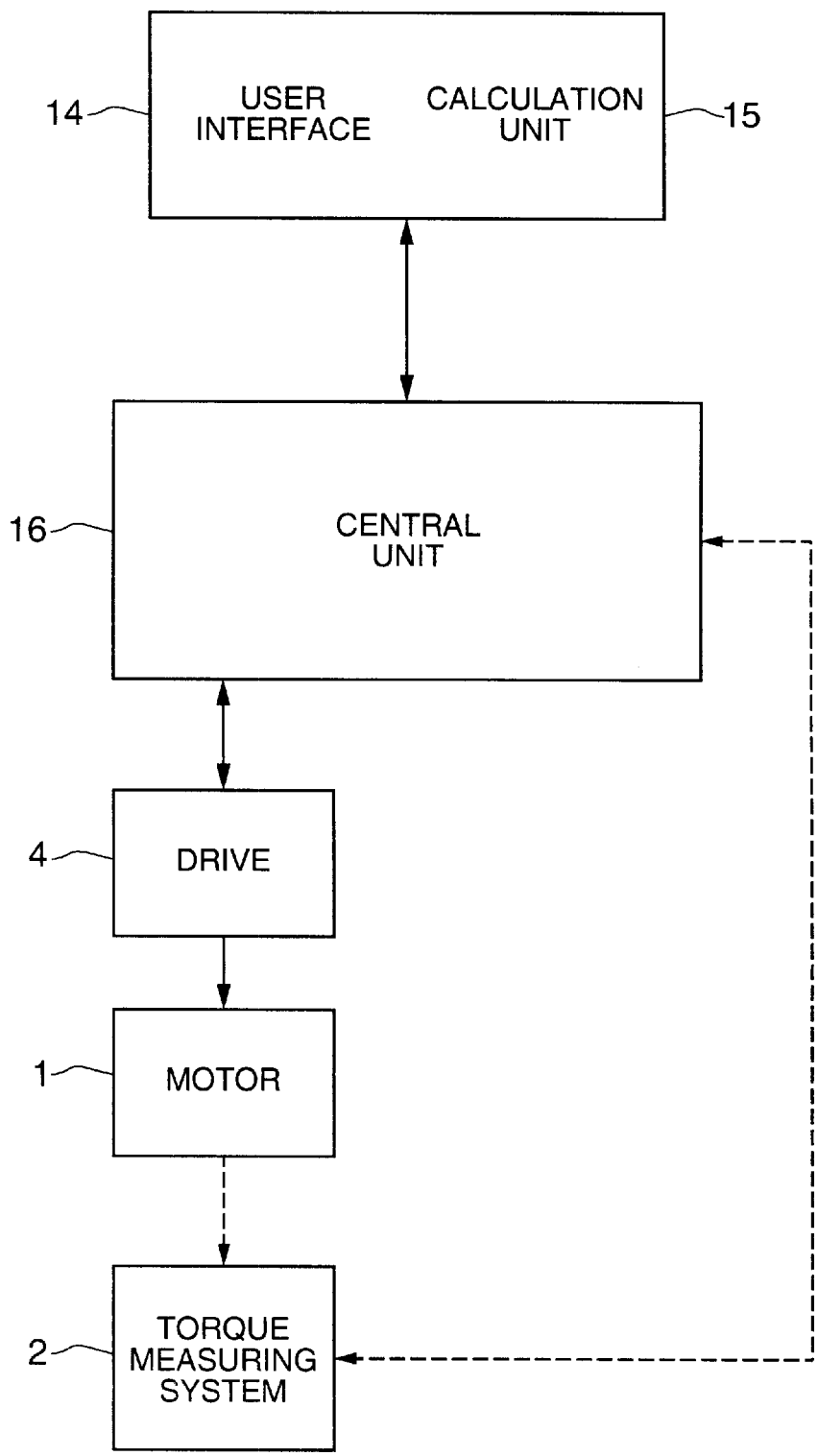
FIG. 3 is a functional block diagram of a motor control device.

FIG. 3 shows diagrammatically the connections between the various units. The interface 14 which is associated with the automaton 15 sends screwing parameters and receives results for display. The central processor unit 16 acquires data, calculates calibration coefficients, issues operating instructions and recovers and transmits results to the automaton 15 and the interface 14. To this end, the central processor unit 16 communicates with the variable speed drive 4 which itself sends instructions to the motor 1. The torque measuring system 2 is removably coupled mechanically to the motor 1 and removably connected by a communication bus link to the central processor unit 16.

Finally, FIG. 5 shows the internal structure of the torque measuring system 2 which includes a microcontroller 25, a measurement amplifier 26, a torque sensor 27, a power supply module 28 and an interface 29 for the connection to the bus 17, in addition to the bush 20, the display 22, which can be a liquid crystal display, and the pushbuttons 23. The connector 24 is connected to the power supply 28 and to the interface 29. The power supply 28 supplies electrical power to the display 22, the microcontroller 25 and the torque sensor 27. The torque sensor 27 is associated with the bush 20 so that it can measure the torque applied to the bush 20 and sends an output signal to the amplifier 26 whose output is in turn connected to the microcontroller 25. The display 22 is controlled by the microcontroller 25 which is also connected to the pushbutton 23 and to the interface 29 for sending and receiving information via the bush 17.

There is claimed:

1. A device for controlling an electric motor, said device including means for measuring a current $I_m$ drawn by said motor, means for measuring torque supplied by said motor, power supply means for said motor, and an initialization unit capable of generating a torque set point $C_c$ and of receiving and processing information relating to said current $I_m$ and a measured torque $C_m$ to deduce therefrom a relationship between said set point $C_c$, the measured torque $C_m$ and said current $I_m$ in order to be able to determine an applied torque $C_a$ from said set point $C_c$ and said current $I_m$.

2. The device claimed in claim 1 wherein said means for measuring said torque $C_m$ supplied by said motor are removable.

3. The device claimed in claim 1 further including a calculation unit associated with memory means and a user interface, a first data bus between said initialization unit and said power supply means of said motor, and a second data bus between said initialization unit and said calculation unit.

4. The device claimed in claim 1 wherein said means for measuring said torque $C_m$ are provided with a removable calibrator.

5. The device according to claim 1, wherein said initialization unit is a central processing unit.

6. An electromechanical system including a device for controlling an electric motor, said device including means for measuring a current $I_m$ drawn by said motor, means for measuring a torque supplied by said motor, power supply means for said motor, and an initialization unit capable of generating a torque set point $C_c$ and of receiving and processing information relating to said current $I_m$ and a measured torque $C_m$ to deduce therefrom a relationship between said set point $C_c$, said torque $C_m$ and said current $I_m$ in order to be able to determine an applied torque $C_a$ from said set point $C_c$ and said current $I_m$.

7. The system claimed in claim 6 wherein said means for measuring said torque $C_m$ supplied by said motor are removable.

8. The system claimed in claim 6 further including a calculation unit associated with memory means and a user interface, a first data bus between said initialization unit and said power supply means of said motor, and a second data bus between said initialization unit and said calculation unit.

9. The system claimed in claim 6 wherein said means for measuring said torque $C_m$ are provided with a removable calibrator.

10. The system according to claim 6, wherein said initialization unit is a central processing unit.

11. A method of controlling an electric motor in which an initialization unit generates a torque set point $C_c$ addressed to power supply means of said motor, current measuring means measure a current $I_m$ drawn by said motor, torque measuring means measure a torque supplied by said motor, said initialization unit receives and processes information relating to said current $I_m$ and a measured torque $C_m$ to deduce therefrom a relationship between said set point $C_c$, said torque $C_m$ and said current $I_m$ in order to be able to determine an applied torque $C_a$ from said set point $C_c$ and said current $I_m$.

12. The method claimed in claim 11 wherein said torque measuring means are installed beforehand and then removed after measuring at least one value of said torque $C_m$.

13. The method claimed in claim 11 wherein said initialization unit generates three torque set point values $C_c$, said current measuring means measure n values of said current $I_m$ drawn by said motor, where n is greater than 2, said torque measuring means measure n values of said torque $C_m$, and said initialization unit receives and processes n values relating to said current $I_m$ and said torque $C_m$ to deduce therefrom a relationship between said set point $C_c$, said torque $C_m$ and said current $I_m$ in order to be able to determine an applied torque $C_a$ from only said set point $C_c$ and said current $I_m$.

14. The method claimed in claim 13 wherein said initialization unit calculates three coefficients a, b, c of a second order equation relating to said set point $C_c$ and said torque $C_a$ and three coefficients a', b', c' of a second order equation linking said current $I_m$ and said torque $C_m$.

15. The method according to claim 11, wherein said initialization unit is a central processing unit.

16. A computer program including program code means for implementing the steps of a method of controlling an electric motor in which an initialization unit generates a torque set point $C_c$ addressed to power supply means of said motor, current measuring means measure the current $I_m$ drawn by said motor, torque measuring means measure a torque supplied by said motor, said initialization unit receives and processes information relating to said current $I_m$ and a measured torque $C_m$ to deduce therefrom a relationship between said set point $C_c$, said torque $C_m$ and said current $I_m$ in order to be able to determine an applied torque $C_a$ from said set point $C_c$ and said current $I_m$.

17. The program claimed in claim 16 wherein said torque measuring means are installed beforehand and then removed after measuring at least one value of said torque $C_m$.

18. The program claimed in claim 16 wherein said initialization unit generates three torque set point values $C_c$, said current measuring means measure n values of said current $I_m$ drawn by said motor, where n is greater than 2, said torque measuring means measure n values of said torque $C_m$, and said initialization unit receives and processes n values relating to said current $I_m$ and said torque $C_m$ to deduce therefrom a relationship between said set point $C_c$, said torque $C_m$ and said current $I_m$ in order to be able to determine an applied torque $C_a$ from only said set point $C_c$ and said current $I_m$.

19. The program claimed in claim 18 wherein said initialization unit calculates three coefficients a, b, c of a second order equation relating to set point $C_c$ and said torque $C_m$ and three coefficients a', b', c' of a second order equation linking said current $I_m$ and said torque $C_a$.

20. A medium which can be read by a device for reading program code means stored therein and which are adapted to implement the steps of a method of controlling an electric motor in which an initialization unit generates a torque set point $C_c$ addressed to power supply means of said motor, current measuring means measure the current $I_m$ drawn by said motor, torque measuring means measure a torque supplied by said motor, said initialization unit receives and processes information relating to said current $I_m$ and a measured torque $C_m$ to deduce therefrom a relationship between said set point $C_c$, said torque $C_m$ and said current $I_m$ in order to be able to determine an applied torque $C_a$ from said set point $C_c$ and said current $I_m$.

21. The medium claimed in claim 20 wherein said torque measuring means are installed beforehand and then removed after measuring at least one value of said torque $C_m$.

22. The medium claimed in claim 20 wherein said initialization unit generates three torque set point values $C_c$, said current measuring means measure n values of said current $I_m$ drawn by said motor, where n is greater than 2, said torque measuring means measure n values of said torque $C_m$, and said initialization unit receives and processes n values relating to said current $I_m$ and said torque $C_m$ to deduce therefrom a relationship between said set point $C_c$, said torque $C_m$ and said current $I_m$ in order to be able to determine said torque $C_a$ from only said set point $C_c$ and said current $I_m$.

23. The medium claimed in claim 22 wherein said initialization unit calculates three coefficients a, b, c of a second order equation relating to set point $C_c$ and said torque $C_a$ and three coefficients a', b', c' of a second order equation linking said current $I_m$ and said torque $C_a$.

24. A device for controlling an electric motor, said device including at least one current measuring module for measuring the current $I_m$ drawn by said motor, a torque measuring system for measuring torque supplied by said motor, a power supply for said motor, and a central processing unit capable of generating torque set point $C_c$ and of receiving and processing information relating to said current $I_m$ and the measured torque $C_m$ to deduce information therefrom a relationship between said set point torque $C_c$, the measured torque $C_m$, and said current $I_m$ in order to be able to determine the applied torque $C_a$ from said set point torque $C_c$ and said current $I_m$.

* * * * *